(12) United States Patent
Ha

(10) Patent No.: US 9,188,492 B2
(45) Date of Patent: Nov. 17, 2015

(54) APPARATUS FOR DETECTING FLUID TEMPERATURE AND LEVEL IN A CONTAINER

(71) Applicant: Long Van Ha, Walnut, CA (US)

(72) Inventor: Long Van Ha, Walnut, CA (US)

(*) Notice: Subject to any disclaimer, the term of this patent is extended or adjusted under 35 U.S.C. 154(b) by 108 days.

(21) Appl. No.: 13/965,295

(22) Filed: Aug. 13, 2013

(65) Prior Publication Data

US 2015/0047429 A1    Feb. 19, 2015

(51) Int. Cl.
*G01F 23/00*    (2006.01)
*G01K 7/02*    (2006.01)
*G01F 23/22*    (2006.01)
*G01K 1/14*    (2006.01)

(52) U.S. Cl.
CPC *G01K 7/02* (2013.01); *G01F 23/22* (2013.01); *G01K 1/146* (2013.01); *G01K 2205/00* (2013.01)

(58) Field of Classification Search
None
See application file for complete search history.

(56) References Cited

U.S. PATENT DOCUMENTS

| 5,575,563 | A * | 11/1996 | Chiu et al. | 374/141 |
| 8,702,693 | B2 * | 4/2014 | Subramaniam et al. | 606/40 |
| 2013/0177122 | A1 * | 7/2013 | Fushimi et al. | 376/247 |
| 2014/0298903 | A1 * | 10/2014 | Goto et al. | 73/292 |

* cited by examiner

*Primary Examiner* — Peter Macchiarolo
*Assistant Examiner* — Jermaine Jenkins

(57) ABSTRACT

A fluid monitoring apparatus to simultaneously detect the temperature and level of fluid within a container includes a translucent tube with a proximal end, a distal end, an aperture within the wall of the tube proximate the proximal end of the tube, the distal end able to extend into the fluid container, a thermocouple secured within the tube and tethered via a wire disposable through the aperture in the tube wall, the wire including a first end secured to the thermocouple and a second end secured to a display device to display the temperature of the fluid, and a cap secured to the proximal end of the tube to create a pressure within the tube sufficient to cause the fluid that fills the distal end of the tube to remain in the tube, thereby permitting a user to determine the fluid level of the container.

6 Claims, 2 Drawing Sheets

APPARATUS FOR DETECTING FLUID TEMPERATURE AND LEVEL IN A CONTAINER

RELATED APPLICATION

The application claims priority to provisional patent application U.S. Ser. No. 61/683,180 filed on Aug. 14, 2012, the entire contents of which is herein incorporated by reference.

BACKGROUND

The embodiments herein relate generally to a fluid monitoring apparatus. More specifically, embodiments of the invention relate to an apparatus configured to access a remote fluid container and simultaneously detect both the temperature and level of the fluid in the container.

In certain applications, it is desirable to know the temperature and level of a fluid in a container. This presents users with several challenges when oddly-shaped containers, hard-to-reach containers or hidden containers with limited access are present. The transmission oil pan of an automobile is one type of container that is partially hidden and difficult to access. Certain automobiles require users to monitor the transmission oil level in the pan at a particular temperature after an oil change. In this situation, the user must determine whether the amount of oil refilled is adequate by checking the level of oil in the pan when the oil is at the particular temperature. It is particularly important to measure the oil level in the pan at the correct temperature because the oil level varies by temperature.

Current systems and devices for measuring the temperature and level of oil in a pan are inefficient and limited. Users use a dip stick to measure the oil level in the pan and an infrared thermometer to measure the temperature of the oil. However, these devices are ineffective because the temperature and level of oil are measured at different times, which can lead to an oil level and temperature reading that is inaccurate. In addition, infrared thermometers are limited because they sometimes give false readings under ambient and environmental conditions. Likewise, dip sticks are not accurate because oil often drips down the stick during the time the stick is removed from the transmission pan. As a result, the oil level displayed on the dip stick is usually an approximation.

As such, there is a need in the industry for a fluid monitoring apparatus that can detect the temperature and level of a fluid simultaneously and accurately.

SUMMARY

A fluid monitoring apparatus configured to access a remote fluid container and simultaneously detect both the temperature of fluid within the container and the level of the fluid within the container is provided. The apparatus comprises a flexible tube comprising a translucent wall comprising a proximal end, a distal end, an aperture within the wall of the tube proximate the proximal end of the tube, the distal end configured to extend into the fluid container so that the distal end may come into contact with the fluid within the container in such a manner that permits the distal end to contract the bottom of the fluid container, a thermocouple secured within the tube and tethered via a wire disposable through the aperture in the tube wall, the thermocouple configured to be positioned proximate the distal end of the tube when the distal end of the tube is inserted within the fluid container, the wire comprising a first end configured to be secured to the thermocouple and a second end configured to be secured to a display device, the thermocouple, wire and display device configured to display the temperature of the fluid into which the thermocouple comes into contact, and a cap configured to be secured sealably to the proximal end of the tube to create a pressure within the tube when the distal end of the tube is extended into the fluid container sufficient to cause the fluid that fills the distal end of the tube to remain in the tube when the tube is withdrawn from the fluid container, thereby permitting a user to determine the fluid level by visualizing the fluid level within the distal end of the tube.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
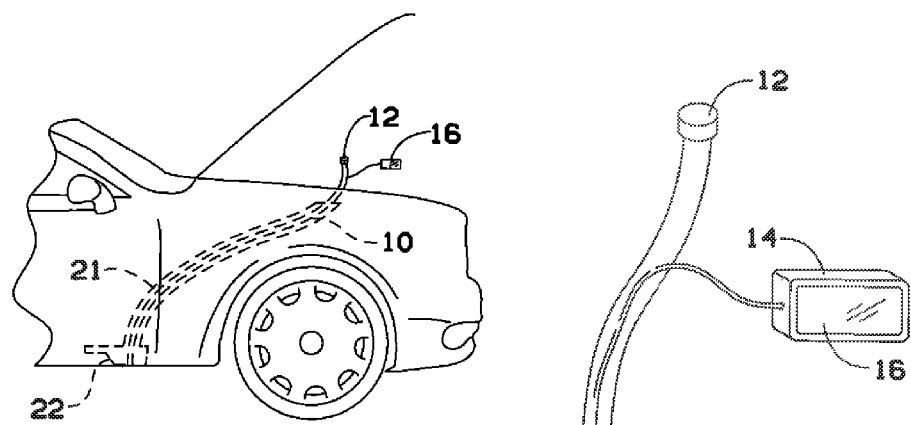
FIG. 1 depicts a side view of certain embodiments of the invention in use.
Figure 2:
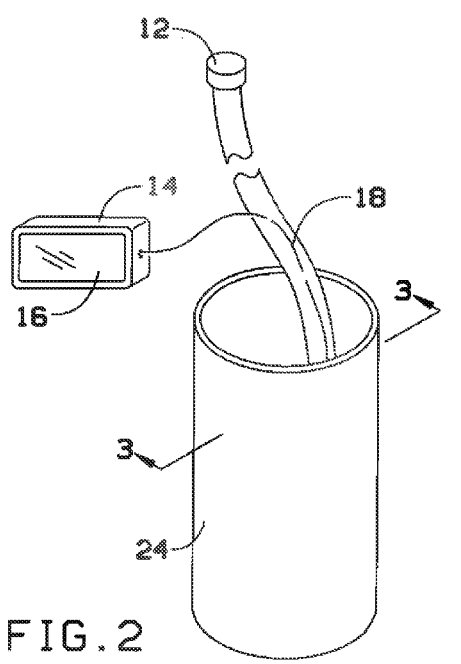
FIG. 2 depicts a perspective view of certain embodiments of the invention.
Figure 3:
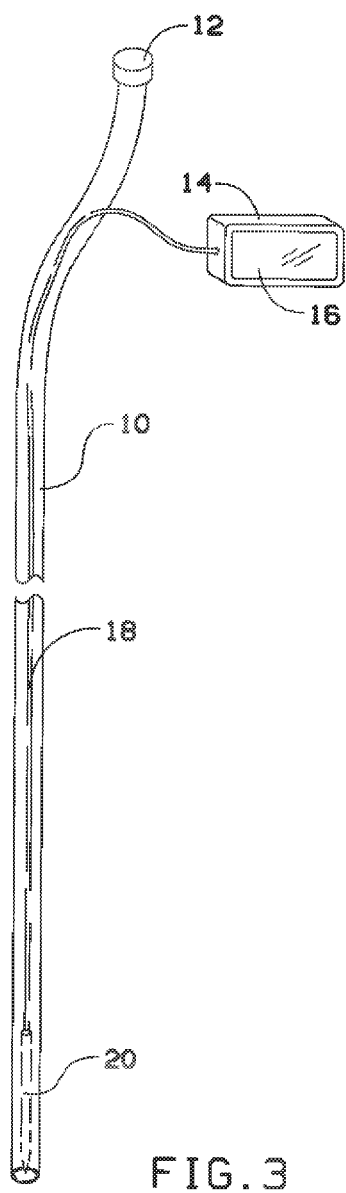
FIG. 3 depicts a perspective view of certain embodiments of the invention.

FIGS. 1-3 depict certain embodiments of the fluid monitoring apparatus. The apparatus comprises translucent tube 10, cap 12, thermocouple body 14, display screen 16, wire 18, and sensor 20. Translucent tube 10 is flexible and is made from polyurethane. This allows translucent tube 10 and wire 18 to fit into any type of container that may be difficult to access. The thermocouple comprises wire 18 attached to sensor 20. Wire 18 and sensor 20 are configured to operate within the range of 0 to 120 degrees Celsius. However, it is understood that the thermocouple may operate in any other temperature range. Wire 18 and sensor 20 are secured within translucent tube 10 such that sensor 20 is proximate the distal end of translucent tube 10. Wire 18 runs along the length of the tube and is disposed through an aperture on a side wall of the tube. In certain embodiments of the invention, wire 18 comprises two wires. Thermocouple body 14 and display screen 16 are secured to wire 18 outside of translucent tube 10. In one application, the apparatus is used in conjunction with filler cap 21 and transmission oil pan 22 of an automobile. However, the apparatus may be used with any other type of container 24.

The components of the fluid monitoring apparatus may be manufactured and assembled by using any known materials, machining and/or manufacturing techniques known in the field.

Figure 4:
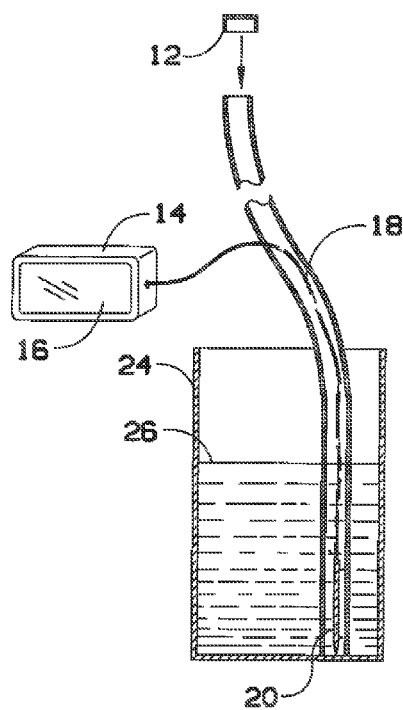
FIG. 4 depicts a sectional view of certain embodiments of the invention in use.
Figure 5:
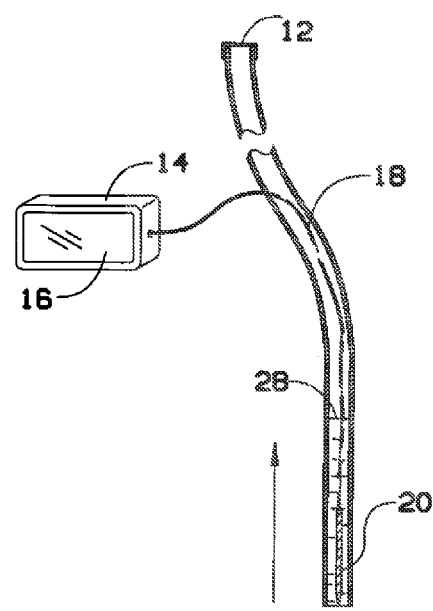
FIG. 5 depicts a sectional view of certain embodiments of the invention in use.
Figure 5:
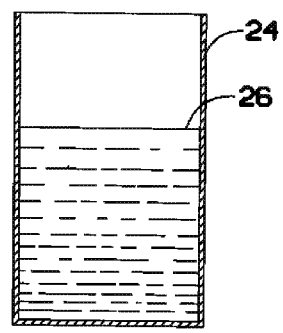

FIGS. 4-5 depict certain embodiments of the fluid monitoring apparatus in use. In operation, a user inserts the distal end of translucent tube 10 into container 24 containing fluid 26. Translucent tube 10 is positioned such that the distal end of the tube reaches the bottom of transmission oil pan 22 or container 24. It shall be appreciated that the apparatus will still operate if the distal end does not reach the bottom of the container so long as the distal end of the tube is submerged in fluid 26. In this configuration, sensor 20, which is submerged in fluid 26, detects the temperature of fluid 26 and displays the reading on display screen 16. The user places cap 12 on the proximal end of translucent tube 10 to seal the tube. This creates a pressure within translucent tube 10 sufficient to hold the fluid that fills the distal end of the tube within the tube when the tube is withdrawn from the fluid container. Upon withdrawing translucent tube 10 from container 24, the user can view the measured fluid level 28 held within the tube. In certain embodiments of the invention, the distal end of translucent tube 10 comprises markings to aid the user in determining the fluid level. It shall be appreciated that the markings may be directed to any known units of measurement known in the field. From the above-mentioned disclosure, it shall be apparent that the fluid monitoring apparatus is configured to simultaneously detect the temperature and level of fluid in a container.

It shall be appreciated that the components of the fluid monitoring apparatus described in several embodiments herein may comprise any known materials in the field and be of any color, size and/or dimensions. This allows the system to accommodate any variety of fluids and containers.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A fluid monitoring apparatus configured to access a remote fluid container and simultaneously detect both the temperature of fluid within the container and the level of the fluid within the container, the fluid monitoring apparatus comprising:

a flexible tube comprising a translucent wall comprising a proximal end, a distal end, an aperture within the wall of the tube proximate the proximal end of the tube, the distal end configured to extend into the fluid container so that the distal end may come into contact with the fluid within the container in such a manner that permits the distal end to contract the bottom of the fluid container;

a thermocouple secured within the tube and tethered via a wire disposable through the aperture in the tube wall, the thermocouple configured to be positioned proximate the distal end of the tube when the distal end of the tube is inserted within the fluid container, the wire comprising a first end configured to be secured to the thermocouple and a second end configured to be secured to a display device, the thermocouple, wire and display device configured to display the temperature of the fluid into which the thermocouple comes into contact; and a cap configured to be secured sealably to the proximal end of the tube to create a pressure within the tube when the distal end of the tube is extended into the fluid container sufficient to cause the fluid that fills the distal end of the tube to remain in the tube when the tube is withdrawn from the fluid container, thereby permitting a user to determine the fluid level by visualizing the fluid level within the distal end of the tube.

2. The fluid monitoring apparatus of claim 1, wherein the distal end of the flexible tube comprises markings to aid the user in determining the fluid level in the container.

3. The fluid monitoring apparatus of claim 1, wherein the first end of the wire comprises a sensor.

4. The fluid monitoring apparatus of claim 1, wherein the flexible tube comprises polyurethane.

5. The fluid monitoring apparatus of claim 1, wherein the flexible tube and the thermocouple are configured to access a transmission oil pan of an automobile.

6. The fluid monitoring apparatus of claim 5, wherein the thermocouple is configured to operate when oil in the transmission oil pan is within the range of 0 to 120 degrees Celsius.

* * * * *